United States Patent [19]

Nezworski

[11] 4,185,769

[45] Jan. 29, 1980

[54] EXHAUST FLUE DAMPER AND CONTROL SYSTEM THEREFOR

[76] Inventor: James E. Nezworski, 1310 Sunnycrest Dr., Waukesha, Wis. 53186

[21] Appl. No.: 832,539

[22] Filed: Sep. 12, 1977

[51] Int. Cl.² .......................................... G05D 23/12
[52] U.S. Cl. .................................. 236/1 G; 236/1 H
[58] Field of Search ................. 236/1 R, 1 G, 1 H, 45

[56] References Cited

U.S. PATENT DOCUMENTS

| | | | |
|---|---|---|---|
| 2,397,879 | 4/1946 | Morrow | 236/1 G |
| 2,633,299 | 3/1953 | Brown | 236/1 G |
| 2,698,140 | 12/1954 | Buehler | 236/1 G |

FOREIGN PATENT DOCUMENTS

| | | | |
|---|---|---|---|
| 527568 | 6/1931 | Fed. Rep. of Germany | 236/1 G |
| 2359278 | 5/1975 | Fed. Rep. of Germany | 236/1 G |

*Primary Examiner*—Patrick D. Lawson

[57] ABSTRACT

A control system for a damper installed in the exhaust flue of a furnace, by which activation of the furnace is rendered impossible unless the damper is in its fully open position. The control system achieves that objective by making completion of the energizing circuit of the solenoid that controls flow of fuel to the burner dependent upon closure of a normally open switch that is closed by the movement of the damper to its open position, and by opening the damper with an electric motor that is controlled by a relay energized in response to a call for heat at the thermostat.

2 Claims, 4 Drawing Figures

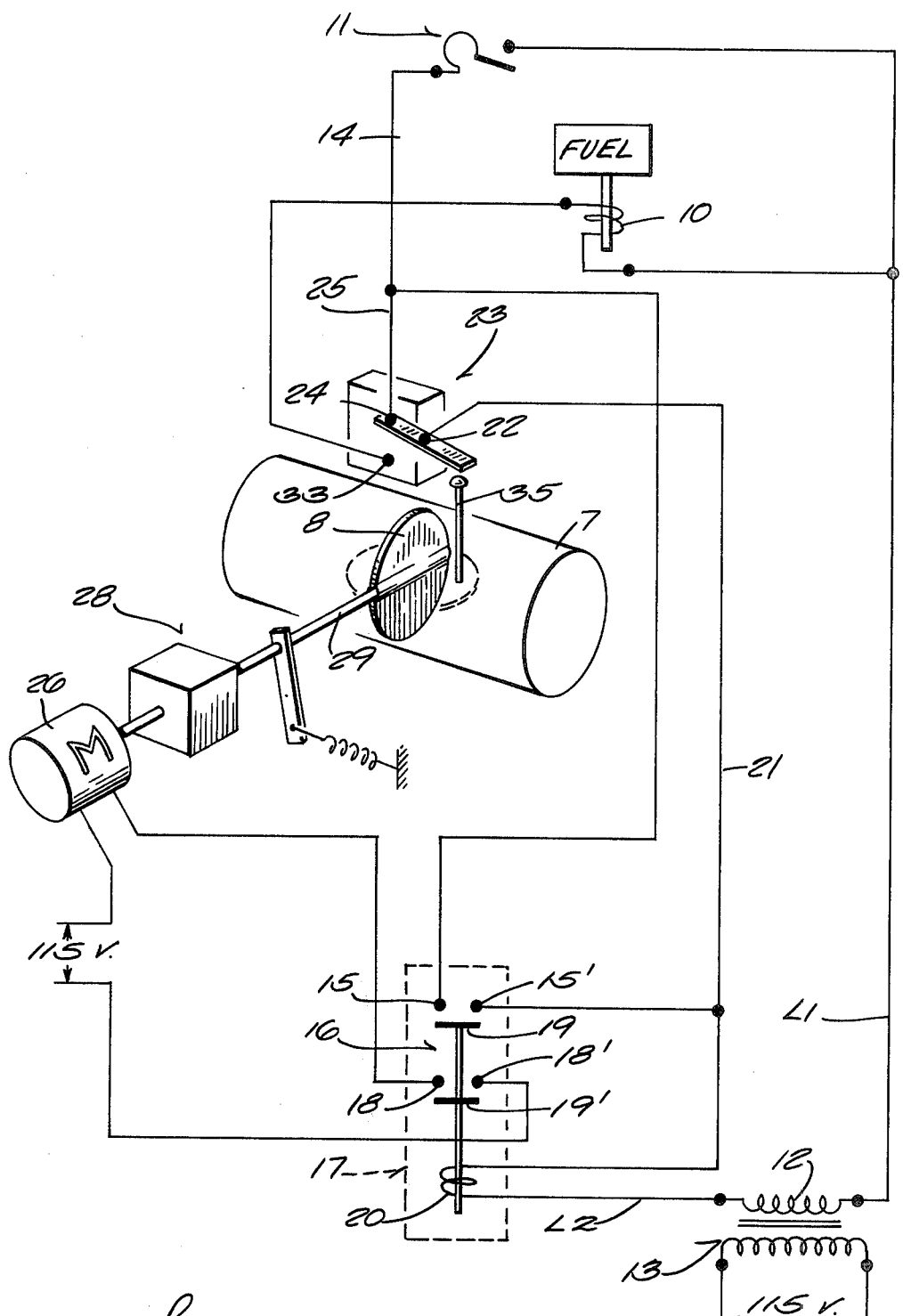

EXHAUST FLUE DAMPER AND CONTROL SYSTEM THEREFOR

This invention is concerned with energy conservation and more particularly relates to a control system by which a substantial saving is effected in the amount of fuel used for home heating purposes.

It has long been recognized that considerable heat energy is wasted by the conventional practice of leaving the combustion chambers of home heating furnaces unrestrictedly communicated with the stack or chimney. In an earlier day when homes were heated by a coal-burning stove laboriously set up in the sitting room at the approach of cold weather, and returned to its place of storage when spring came along, there was always a manually adjustable damper in the stove pipe through which the stove was connected with the chimney. Adjustment of that damper not only regulated the draft needed to maintain the fire, but to a degree at least reduced the loss of heat "up the chimney". Present day furnace installations have no such manually adjustable dampers, and—if they did—they would seldom, if ever, be used. Only an automatically controlled damper would be acceptable to the modern home owner.

The concept of an automatically adjusted damper in the flue leading from the furnace to the stack is by no means new. Many schemes for the attainment of that objective have been proposed in the past, only to fail because they were not safe and foolproof. Unless the damper is open whenever the burner of the furnace is in operation, a dangerous condition exists, and unless the damper is closed when the burner is deactivated, the desired saving in heat energy is not realized.

The present invention meets these requirements, but what is most important, it does so in an absolutely foolproof and safe way. With the damper control system of this invention, the solenoid-controlled fuel valve by which the flow of fuel (oil or gas) to the burner is regulated, will not open unless the damper is open. To that end, the invention comprises:

A control system for a damper installed in the exhaust flue of a thermostatically controlled furnace of the type wherein a call for heat at the thermostat, acting through electric circuitry activates the burner by effecting energization of a burner control solenoid, the damper being biased to its closed position, and said control system assuring against activation of the burner unless the damper is fully open, said control system comprising:

electrically powered motion producing means operatively connected with the damper to open the same when energized; relay means including an activating solenoid, and a normally open switch electrically interposed between said motion producing means and its source of current, and operative upon energization of the activating solenoid of the relay means to effect energization of the motion producing means; circuit means including the switch of the thermostat, a source of current, and the activating solenoid of the relay means operative upon response of the thermostat to a call for heat to energize said solenoid and thereby effect energization of the motion producing means to cause the same to move motion producing means to cause the same to move the damper to its open position; a normally open control switch connected between the burner control solenoid and its source of current to render operation of the burner dependent upon closure of said normally open control switch; a mechanical switch actuator constituting the only means by which said normally open control switch can be closed; and means mounting said mechanical switch actuator in the path of the damper as it moves to its open position whereby closure of said control switch and consequent activation of the burner is affected by and depends upon movement of the damper to its open position.

With these observations and objectives n mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the emodiment of the invention constructed according to the best mode so far devised for the practical application of the principles thereof, and in which:

FIG. 4 is a diagram of the control system.

Figure 1:
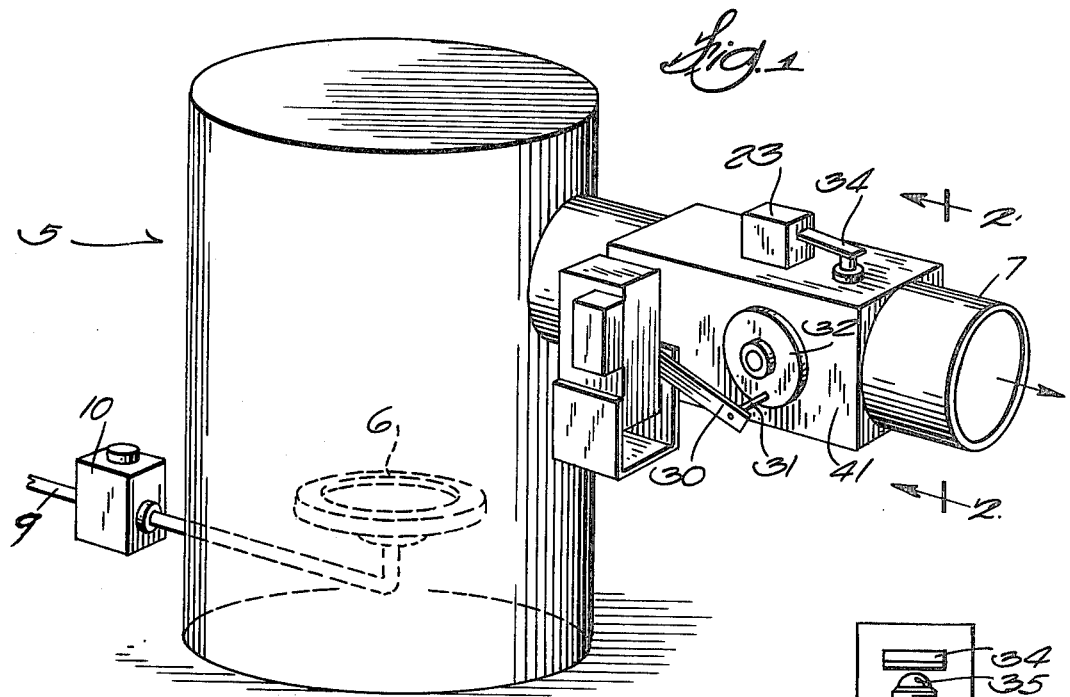
FIG. 1 is a perspective view, more or less diagrammatically illustrating a typical furnace equipped with this invention.
Figure 2:
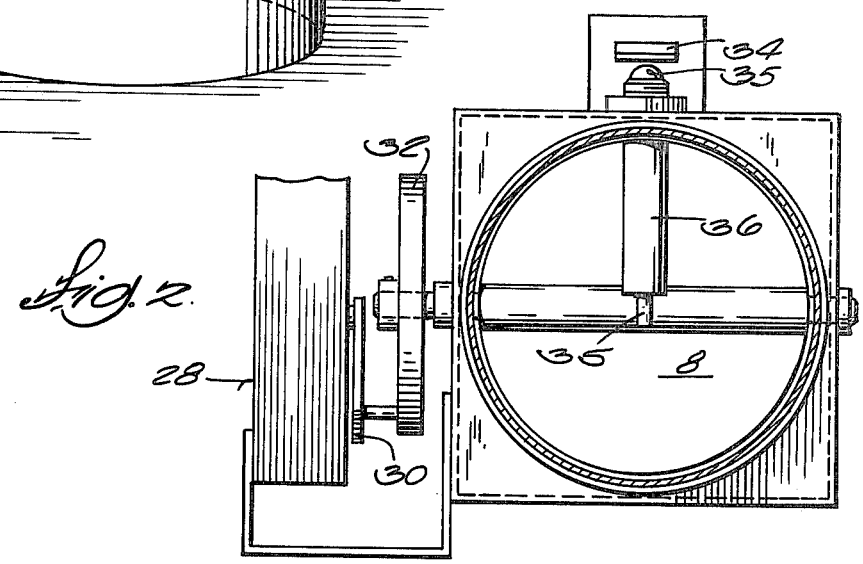
FIG. 2 is a cross sectional view, on a larger scale, through FIG. 1 on the plane of the line 2—2.

Referring to the accompanying drawings, the numeral 5 designates a typical furnace having a burner 6 in its combustion chamber. As is customary, the combustion chamber of the furnace is connected by an exhaust flue 7 with the stack or chimney (not shown) of the home heated by the furnace. Installed in the exhaust flue is the damper 8, the automatic control of which is the concern of this invention. Fuel, either oil or gas, if fed to the burner through a supply line 9 when a fuel control solenoid 10 is energized in response to a call for heat at a room thermostat, indicated at 11 in FIG. 4. As is customary, the solenoid 10 effects its control of the supply of fuel to the burner through a fuel shut-off valve (not shown, but diagrammatically indicated in FIG. 4) connected in the supply line 9.

Current for the energization of the solenoid 10 is derived from the secondary 12 of a stepdown transformer 13, the primary of which is connected with a source of current in the customary way. The line L1 from the transformer secondary connects with one terminal of the room thermostat and one terminal of the solenoid 10 as shown in FIG. 4. The other terminal of the room thermostat is connected by a line 14 with one of a pair of stationary contacts 15-15' of a single-throw double pole switch 16 that forms part of a relay 17. In addition to the contacts 15-15', the switch 16 includes a second pair of stationary contacts 18, 18' and movable contactors 19, 19' that respectively bridge the contacts 15, 15' and 18, 18' upon energization of the solenoid 20 of the relay. As shown in FIG. 4, the switch 16 is normally open; its closure—which is effected by energization of the solenoid 20—occurs when the room thermostat responds to a call for heat.

The circuit by which the solenoid 20 is energized is formed by the line L2 that leads from the secondary of the transformer to one terminal of the solenoid, a line 21 that leads from the other terminal of the solenoid to the contactor 22 of a microswitch 23, that normally engages a stationary contact 24, and a line 25 that leads from that contact to the thermostat.

With the contacts 15, 15' bridged by closure of the double pole single-throw switch 16, a holding circuit is established by which the solenoid of the relay 17 is maintained energized; and the concomitant bridging of the contacts 18, 18' connects an electric motor 26 with a source of current, as will be evident from FIG. 4. As will also be apparent as the description proceeds, the specific nature of the motor 26 is not important. It can be a conventional rotary motor, a solenoid or any other suitable device for converting electric energy into mechanical motion. Whatever type of electrically powered motion producing means is employed, its output is connected through suitable drive instrumentalities 28 with the shaft 29 of the damper 8.

Figure 3:
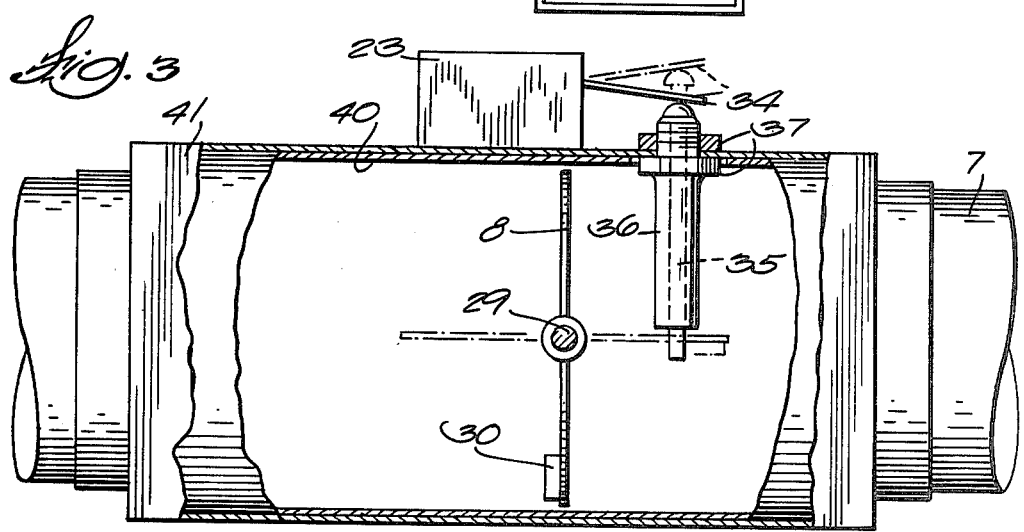
FIG. 3 is a side view with parts broken away and in section, of that portion of the furnace flue in which the damper is located, illustrating the manner in which the approach of the damper to its open position actuates one of the switches of the electrical control system.

The shaft 29 of the damper passes through and is freely rotatably supported in diametrically opposite holes in the exhaust flue so that the damper can swing between a closed position and an open position shown respectively in full lines and by dotted lines in FIG. 3. The damper is biased to its closed position in any suitable way, as by the attachment of a weight 30 thereto, if the section of the exhaust flue in which the damper is located is horizontal or substantially so, or by a torsion spring or the like if the exhaust flue section in which the damper is installed is vertically oriented. In either case, energization of the motor 26 results in movement of the damper from its closed position to its open position.

If the motor 26 is of the rotary type it may be a Granger No. 2C831 shutter motor, the drive shaft of which is connected by a connecting rod or link 30 with a crank pin 31 on a disc 32 fixed to the shaft 29 of the damper. In this case the disc 32, the crank pin 31 and the link 30 constitute the drive instrumentalities 28 through which the motor is drivingly connected with the damper. As will be understood by those skilled in the art, the motor regardless of its type, must be capable of holding the damper in its open position as long as the motor is energized.

One of the most important aspects of the invention is the fact that the movement of the damper to its open position trips the micro switch 23 and thereby snaps its contactor 22 out of engagement with the contact 24 and into engagement with a contact 33. With that response of the micro switch the solenoid 10 of the fuel shut-off valve is energized to open the valve and permit fuel to reach the burner. That condition obtains as long as the solenoid 10 remains energized, which, in the absence of a malfunction, continues until the room thermostat switch opens.

The manner in which movement of the damper to its open position trips the micro switch is best illustrated in FIG. 3. As there shown, the micro switch is mounted on the exhaust flue with its actuating finger 34 overlying a motion transmitting rod or plunger 35 that is freely slidably mounted in a tubular guideway 36 secured in a hole in the wall of the exhaust flue as by a pair of clamping nuts 37 threaded onto the tubular guideway.

The location on the exhaust flue of the micro switch and the tubular guideway with respect to the axis about which the damper swings, must be such that the inner end of the rod or plunger lies in the path of a peripheral area of the damper as the latter moves to its open position; and the length of the rod or plunger must be such that the motion imparted to it by the damper moving to its open position moves the actuating finger 34 of the micro switch far enough to snap the contactor of the switch out of engagement with the contact 24 and into engagement with the contact 33.

Where the section of the exhaust flue in which the damper is located is horizontally oriented, the micro switch is seated on the top wall of the flue and the tubular guideway is vertical. Accordingly, gravity holds the rod or plunger in its potentially operative position defined by the engagement of a head 37 with the upper end of the guideway.

If the flue portion in which the damper is located is vertically oriented, the motion imparting rod or plunger can be biased to its potentially operative position by a light spring confined between opposing shoulders on the plunger and the guideway.

Although the damper, micro switch and the motion transmitting means by which movement of the damper to its open position trips the switch can be mounted directly onto the exhaust flue, it is preferable to embody all of these parts in a completely shop assembled unit that can be interposed between spaced lengths of the exhaust flue. That unit consists simply of a length of pipe 40 of a size to have a telescoping fit with the lengths of the exhaust flue between which the unit is located, and a flat sided shell 41—preferably square in cross section—encircling and fixed to the pipe 40. The flat surfaces of the shell facilitate the mounting of the micro switch, the motor 26 and the drive instrumentalities 28.

To review the operation of the system, upon response of the room thermostat to a call for heat, the energizing circuit for the solenoid of the relay 17 is closed. With the resulting energization of that solenoid, the normally open double pole single throw switch 16 closes, and by that closure the electrically powered motion producing means, i.e., the motor 26 is activated. This results in movement of the normally closed damper to its open position. During its final few degrees of movement to its open position, the damper collides with and lifts the rod or plunger 35, which in turn trips the micro switch 23. With that, the normally closed switch consisting of the contactor 22 and the contact 24 is opened and the normally open switch consisting of the contactor 22 and the contact 33 is closed. Not until that happens can the burner begin to function since energization of the solenoid that controls the fuel supply valve requires closure of that normally open switch, and that cannot occur until the damper is opened.

If perchance the contacts (22 and 33) of the normally open micro switch were to "fuse" closed, opening of the thermostat switch, which would of course take place when the temperature to which it responds reaches the set level, the holding circuit for the solenoid of the relay 17 would be interrupted (at the thermostat) allowing the relay switches to open. While the resulting interruption of the energizing circuit of the motor 26 would allow the damper to return to its closed position, the instant the relay switches opened, the energizing circuit for the solenoid 10 of the fuel control valve would be broken and the fuel control valve would close and shut off the supply of fuel to the burner.

A possible subsequent call for heat at the thermostat would go unanswered since for closure of the thermostat switch to initiate a burner-starting cycle, the normally closed contacts (22 and 24) of the micro switch would have to be engaged, which would be impossible with the contactor 22 fused to the contact 33.

It follows therefore that no conceivable malfunction of the system could result in burner operation while the damper is closed.

Those skilled in the art will appreciate that the invention can be embodied in forms other than as herein disclosed for purposes of illustration.

The invention is defined by the following claims:

I claim:

1. A damper assembly for installation in the exhaust flue of a furnace having a burner, comprising:
  A. a length of pipe having means at its opposite ends for connection with upstream and downstream portions of the exhaust flue;
  B. a damper;
  C. means mounting the damper in said length of pipe for swinging movement about a fixed axis that is transverse to said length of pipe between open and closed positions;
  D. means biasing the damper to its closed position;
  E. means for opening the damper comprising
    (1) electrically powered motion producing means fixed with respect to said length of pipe, and
    (2) motion transmitting means connected between the damper and said electrically powered motion producing means; and
  F. means for initiating operation of the burner of the furnace as a consequence of movement of the damper to its open position comprising
    (1) an electric switch fixed with respect to said length of pipe and having an actuator by which the switch is tripped, overlying a hole in said length of pipe, said hole being in line with a peripheral area of the damper that is remote from the axis about which it swings;
    (2) a tubular guideway fixed in said hole, and
    (3) a motion transmitting plunger slidable in said tubular guideway with one end thereof positioned to have said peripheral area of the damper collide therewith as the damper moves to its open position and its other end engageable with the actuator of the switch to trip the same as the damper reaches its open position.

2. A damper assembly for installation in the exhaust flue of a home heating furnace or boiler having a controllable burner, comprising:
  A. a length of pipe having means at its opposite ends for connection with upstream and downstream portions of the exhaust flue;
  B. a damper;
  C. means mounting the damper in said length of pipe for swinging movement between open and closed positions about a fixed axis transverse to said length of pipe;
  D. means biasing the damper to its closed position;
  E. means for opening the damper comprising
    (1) electrically powered motion producing means fixed with respect to said length of pipe, and
    (2) motion transmitting means connecting the damper with said electrically powered motion producing means; and
  F. means for initiating operation of the burner of the furnace as a consequence of movement of the damper to its open position comprising:
    (1) a normally open electric switch which must be closed to initiate the operation of the burner, said switch being fixed with respect to said length of pipe and having an actuator which constitutes the only means by which the switch can be tripped to its closed condition,
    (2) rigid motion transmitting member movably mounted on said length of pipe in a manner constraining the same to motion along a path that intersects the actuator of the switch and also a portion of the damper that is spaced from the axis about which it swings;
    (3) the dimensions of said motion transmitting member and its positional relationship with respect to the location of said actuator of the switch and the axis about which the damper swings being such that during the final degrees of its motion to open position the damper collides with the actuator and thereby imparts switch-tripping motion to the actuator, to assure the damper being in its open position at the time operation of the burner is initiated.

* * * * *